(12) United States Patent
Wu et al.

(10) Patent No.: US 10,448,081 B2
(45) Date of Patent: Oct. 15, 2019

(54) MULTIMEDIA INFORMATION PROCESSING METHOD, TERMINAL, AND COMPUTER STORAGE MEDIUM FOR INTERACTIVE USER SCREEN

(71) Applicant: TENCENT TECHNOLOGY (SHENZHEN) COMPANY LIMITED, Shenzhen (CN)

(72) Inventors: Baosen Wu, Shenzhen (CN); Ruofan Li, Shenzhen (CN); Lanwen Chen, Shenzhen (CN); Ming Shi, Shenzhen (CN); Xuyu Xu, Shenzhen (CN); Weiwei Tang, Shenzhen (CN); Xiongzhao Xie, Shenzhen (CN); Kangrui Wu, Shenzhen (CN); Yu Lin, Shenzhen (CN); Chao Feng, Shenzhen (CN); Quan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 202 days.

(21) Appl. No.: 15/712,944

(22) Filed: Sep. 22, 2017

(65) Prior Publication Data
US 2018/0027274 A1 Jan. 25, 2018

Related U.S. Application Data

(63) Continuation of application No. PCT/CN2016/081770, filed on May 11, 2016.

(30) Foreign Application Priority Data

Nov. 11, 2015 (CN) .......................... 2015 1 0768422

(51) Int. Cl.
*H04N 21/414* (2011.01)
*H04N 21/422* (2011.01)
(Continued)

(52) U.S. Cl.
CPC ..... *H04N 21/414* (2013.01); *H04N 21/42224* (2013.01); *H04N 21/431* (2013.01);
(Continued)

(58) Field of Classification Search
CPC ............. H04N 21/414; H04N 21/4224; H04N 21/431; H04N 21/4325; H04N 21/433;
(Continued)

(56) References Cited

U.S. PATENT DOCUMENTS

| 2007/0038612 A1* | 2/2007 | Sull ........................ G06T 3/4092 |
| 2013/0076788 A1* | 3/2013 | Ben Zvi ................ G06T 19/006 |
| | | 345/633 |
| 2017/0311039 A1* | 10/2017 | Zuo ..................... H04N 21/2668 |

FOREIGN PATENT DOCUMENTS

| CN | 101009009 A | 8/2007 |
| CN | 101236769 A | 8/2008 |

(Continued)

OTHER PUBLICATIONS

The World Intellectual Property Organization (WIPO) International Search Report for PCT/CN2016/081770 dated Jul. 27, 2016 5 Pages (including translation).

(Continued)

*Primary Examiner* — June Y Sison
*Assistant Examiner* — Steven C Nguyen
(74) *Attorney, Agent, or Firm* — Anova Law Group, PLLC

(57) ABSTRACT

An information processing method includes: preloading M pieces of multimedia information after a user screen corresponding to an information item specified in a first application is accessed; arranging the M pieces of loaded multimedia information in a specified storage area in sequence; extracting, after playing of an $i^{th}$ piece of multimedia information ends, an $(i+1)^{th}$ piece of multimedia information (Continued)

from the specified storage area in sequence, and switching to play the $(i+1)^{th}$ piece of multimedia information; generating an interaction screen by means of simulation after playing of the $(i+1)^{th}$ piece of multimedia information ends, the interaction screen comprising a touch interaction object for enabling an $(i+2)^{th}$ piece of multimedia information; responding to a first operation performed on the touch interaction object; extracting the $(i+2)^{th}$ piece of multimedia information from the specified storage area in sequence; and switching to play the $(i+2)^{th}$ piece of multimedia information.

19 Claims, 12 Drawing Sheets

(51) Int. Cl.
　　*H04N 21/431*　　　(2011.01)
　　*H04N 21/432*　　　(2011.01)
　　*H04N 21/433*　　　(2011.01)
　　*H04N 21/442*　　　(2011.01)
　　*H04N 21/458*　　　(2011.01)
　　*H04N 21/472*　　　(2011.01)
　　*H04N 21/4788*　　(2011.01)
　　*H04N 21/81*　　　　(2011.01)
　　*H04N 21/858*　　　(2011.01)

(52) U.S. Cl.
　　CPC ....... *H04N 21/433* (2013.01); *H04N 21/4325* (2013.01); *H04N 21/4333* (2013.01); *H04N 21/442* (2013.01); *H04N 21/458* (2013.01); *H04N 21/472* (2013.01); *H04N 21/4788* (2013.01); *H04N 21/8126* (2013.01); *H04N 21/8173* (2013.01); *H04N 21/8586* (2013.01)

(58) Field of Classification Search
　　CPC ............. H04N 21/4333; H04N 21/442; H04N 21/458; H04N 21/472; H04N 21/4788; H04N 21/8126; H04N 21/8173; H04N 21/8586
　　See application file for complete search history.

(56) References Cited

FOREIGN PATENT DOCUMENTS

| | | |
|---|---|---|
| CN | 103873921 A | 6/2014 |
| CN | 104301797 A | 1/2015 |
| CN | 104581409 A | 4/2015 |
| CN | 104954872 A | 9/2015 |
| CN | 105357561 A | 2/2016 |
| CN | 105357562 A | 2/2016 |
| JP | 2005078173 A | 3/2005 |
| JP | 2005277847 A | 10/2005 |
| JP | 2011040011 A1 | 2/2011 |
| JP | 2011512571 A | 4/2011 |

OTHER PUBLICATIONS

The State Intellectual Property Office of the People's Republic of China (SIPO) Office Action 1 for 201510768422.8 dated Jan. 6, 2017 7 Pages (including translation).

The Japan Patent Office (JPO) Office Action for Application No. 2018-509965 dated Sep. 3, 2018 4 Pages (including translation).

\* cited by examiner

//MULTIMEDIA INFORMATION PROCESSING METHOD, TERMINAL, AND COMPUTER STORAGE MEDIUM FOR INTERACTIVE USER SCREEN

CROSS-REFERENCES TO RELATED APPLICATIONS

This application is a continuation application of PCT Patent Application No. PCT/CN2016/081770, filed on May 11, 2016, which claims priority to claims priority to Chinese Patent Application No. 201510768422.8, entitled "INFORMATION PROCESSING METHOD, TERMINAL, AND COMPUTER STORAGE MEDIUM", filed on Nov. 11, 2015, the entire contents of both of which are incorporated herein by reference.

FIELD OF TECHNOLOGY

The present disclosure relates to information exchange technologies and, in particular, to an information processing method, a terminal, and a computer storage medium.

BACKGROUND OF THE DISCLOSURE

As terminals are becoming intelligent, various applications are installed on the terminals, so as to provide various personalized live services for users by technical means. It is fair to say that a user may be carefree with a terminal in the hand. Using a mobile phone as an example for the terminal, a user might as well install corresponding applications such as a news application, a browser application, and a video playing application on a mobile phone to perform a series of operations such as viewing news, browsing web pages, and playing videos. Multimedia information such as videos, pictures, and text, especially playing of a video combining a voice, an image, and text, can provide more intuitive feelings for a user. A very large amount of information and intuitive feelings can be brought to a user by means of one video.

However, in the current information presentation manner, for example, a static presentation manner such as a single picture or single text frequently used when users are reading the news or browsing web pages, interaction with the users are not strong. For dynamic video playing, a single type of TV series, movies, variety shows, and the like is mostly played. Users just watch a played video. Therefore, interaction with the users are not strong either.

A current user requirement is: information is expected to be presented in a more diversified and interactive manner. For this user requirement, there is few effective solution in the existing related technology.

SUMMARY

In view of this, embodiments of the present invention are intended to provide an information processing method, a terminal, and a computer storage medium, so as to at least resolve a problem in the existing technology, satisfying a user requirement. In this way, information is presented in a more diversified and interactive manner. Therefore, good interactivity is provided between a user and presented information, facilitating information sharing and promotion.

Technical solutions of the embodiments of the present invention are implemented as follows:

An embodiment of the present invention provides an information processing method, including:

preloading M pieces of multimedia information after a user screen corresponding to an information item specified in a first application is accessed by enabling an entrance to the first application, M being a positive integer, and M being greater than or equal to 2; and arranging the M pieces of loaded multimedia information in a specified storage area in sequence;

displaying first information and second information in the user screen, the first information being of a type of statically presented information, and the second information being an $i^{th}$ piece of multimedia information extracted from the specified storage area in sequence;

detecting that the $i^{th}$ piece of multimedia information is in a loading process, an initial status corresponding to the $i^{th}$ piece of multimedia information being a static presentation mode;

after it is detected that loading of the $i^{th}$ piece of multimedia information is complete, switching the status corresponding to the $i^{th}$ piece of multimedia information to a dynamic presentation mode, and playing the $i^{th}$ piece of multimedia information, i being a positive integer, and i being greater than or equal to 1;

extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information; and generating an interaction screen by means of simulation after it is detected that playing of the $(i+1)^{th}$ piece of multimedia information ends, the interaction screen including a touch interaction object for enabling an $(i+2)^{th}$ piece of multimedia information; responding to a first operation performed on the touch interaction object; extracting the $(i+2)^{th}$ piece of multimedia information from the specified storage area in sequence; and switching to play the $(i+2)^{th}$ piece of multimedia information.

Another embodiment of the present invention further provides a terminal, including:

a preloading unit, configured to: preload M pieces of multimedia information after a user screen corresponding to an information item specified in a first application is accessed by enabling an entrance to the first application, M being a positive integer, and M being greater than or equal to 2; and arrange the M pieces of loaded multimedia information in a specified storage area in sequence;

a display unit, configured to display first information and second information in the user screen, the first information being of a type of statically presented information, and the second information being an $i^{th}$ piece of multimedia information extracted from the specified storage area in sequence;

a first detection unit, configured to detect that the $i^{th}$ piece of multimedia information is in a loading process, an initial status corresponding to the $i^{th}$ piece of multimedia information being a static presentation mode;

a second detection unit, configured to: after it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1;

a playing switching unit, configured to: after it is detected that playing of the $i^{th}$ piece of multimedia information ends, extract an $(i+1)^{th}$ piece of multimedia information from the specified storage area in sequence, and switch to play the $(i+1)^{th}$ piece of multimedia information; and an interaction unit, configured to: generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Another embodiment of the present invention further provides a computer storage medium, storing a computer executable instruction, the computer executable instruction being configured to execute the foregoing information processing method.

The information processing method in the embodiments of the present invention includes: preloading M pieces of multimedia information after a user screen corresponding to an information item specified in a first application is accessed by enabling an entrance to the first application, M being a positive integer, and M being greater than or equal to 2; arranging the M pieces of loaded multimedia information in a specified storage area in sequence; displaying first information and second information in the user screen, the first information being of a type of statically presented information, and the second information being an $i^{th}$ piece of multimedia information extracted from the specified storage area in sequence; detecting that the $i^{th}$ piece of multimedia information is in a loading process, an initial status corresponding to the $i^{th}$ piece of multimedia information being a static presentation mode; after it is detected that loading of the $i^{th}$ piece of multimedia information is complete, switching the status corresponding to the $i^{th}$ piece of multimedia information to a dynamic presentation mode, and playing the $i^{th}$ piece of multimedia information, i being a positive integer, and i being greater than or equal to 1; after it is detected that playing of the $i^{th}$ piece of multimedia information ends, extracting an $(i+1)^{th}$ piece of multimedia information from the specified storage area in sequence, and switching to play the $(i+1)^{th}$ piece of multimedia information; generating an interaction screen by means of simulation after it is detected that playing of the $(i+1)^{th}$ piece of multimedia information ends, the interaction screen including a touch interaction object for enabling an $(i+2)^{th}$ piece of multimedia information; responding to a first operation performed on the touch interaction object; extracting the $(i+2)^{th}$ piece of multimedia information from the specified storage area in sequence; and switching to play the $(i+2)^{th}$ piece of multimedia information.

According to the embodiments of the present invention, first information and second information are displayed in the user screen, the first information being of a type of statically presented information, and the second information being an $i^{th}$ piece of multimedia information extracted from the specified storage area in sequence; it is detected that the $i^{th}$ piece of multimedia information is in a loading process, an initial status corresponding to the $i^{th}$ piece of multimedia information being a static presentation mode; and after it is detected that loading of the $i^{th}$ piece of multimedia information is complete, the status corresponding to the $i^{th}$ piece of multimedia information is switched to a dynamic presentation mode, and the $i^{th}$ piece of multimedia information is played. In this way, multiple different information types including a static information type and a dynamic information type can be simultaneously presented in the user screen, so as to present information in a diversified manner. After it is detected that playing of the $i^{th}$ piece of multimedia information ends, an $(i+1)^{th}$ piece of multimedia information is extracted from the specified storage area in sequence, and the $(i+1)^{th}$ piece of multimedia information is switched to for playing. The switch is an automatic seamless switch, and this switch process exactly requires no manual intervention from a user. Therefore, playing is smoother, there is no playing interval between multiple videos, and the user can always obtain an information presentation result and focus more on information sharing during information presentation. An interaction screen is generated by means of simulation after it is detected that playing of the $(i+1)^{th}$ piece of multimedia information ends, the interaction screen including a touch interaction object for enabling an $(i+2)^{th}$ piece of multimedia information; a first operation performed on the touch interaction object is responded to; the $(i+2)^{th}$ piece of multimedia information is extracted from the specified storage area in sequence; and the $(i+2)^{th}$ piece of multimedia information is switched to for playing. That is, an interactive session is added. Therefore, interactivity is provided during information presentation, thereby providing good interactivity between a user and presented information, and better facilitating information sharing and promotion.

DESCRIPTION OF EMBODIMENTS

The following further describes implementation of the technical solutions in detail with reference to the accompanying drawings.

Figure 1:
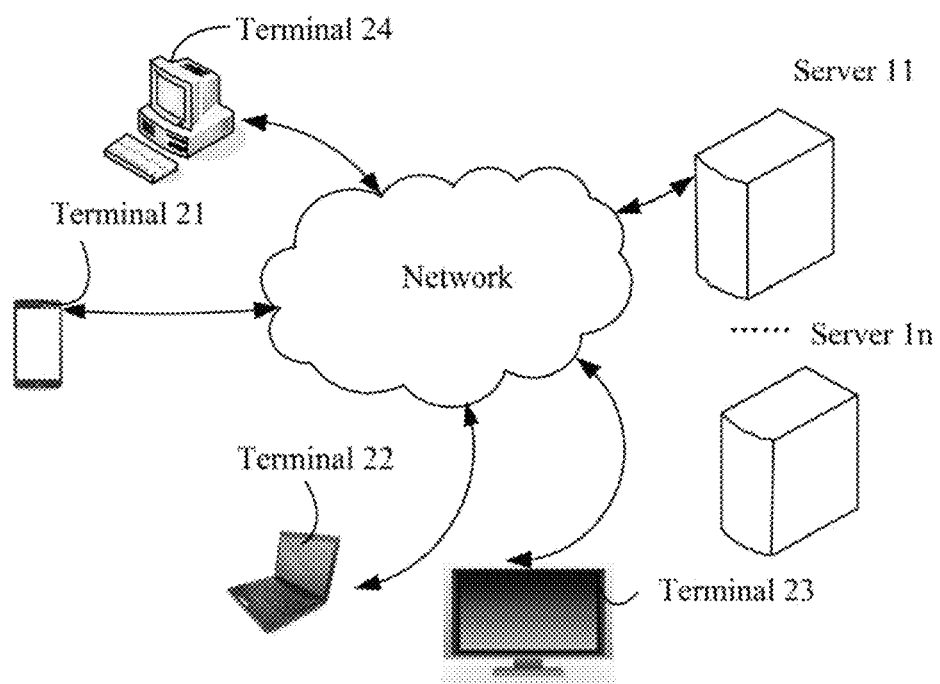
FIG. 1 is a schematic diagram of hardware entities exchanging information according to an embodiment of the present invention.

FIG. 1 is a schematic diagram of hardware entities exchanging information according to an embodiment of the present invention. In FIG. 1, servers 11 to 1n and terminal devices 21 to 24 are included. The terminal devices 21 to 24 exchange information with the servers by using a wired network or wireless network. The terminal device includes a mobile phone, a desk computer, a PC, an all-in-one personal computer, and the like. Multiple applications such as a news application, a web page browsing application, and a video playing application are installed in the terminal device. According to the embodiments of the present invention, based on the system shown in FIG. 1, a terminal obtains multiple videos from a server in advance, or downloads multiple videos from a server in real time if necessary. The terminal preloads M pieces of multimedia information after a user screen corresponding to an information item specified in a first application (for example, a news application or a web page browsing application) is accessed by enabling an entrance to the first application (for example, a news application or a web page browsing application), M being a positive integer, and M being greater than or equal to 2; arranges the M pieces of loaded multimedia information in a specified storage area in sequence; and displays first information and second information in the user screen, the first information being of a type of statically presented information, and the second information being an $i^{th}$ piece of multimedia information extracted from the specified storage area in sequence. In this way, a first aspect of technical effects is achieved: Multiple different information types including a static information type and a dynamic information type can be simultaneously presented in the user screen, so as to present information in a diversified manner. The terminal detects that the $i^{th}$ piece of multimedia information is in a loading process, an initial status corresponding to the $i^{th}$ piece of multimedia information being a static presentation mode; and after detecting that loading of the $i^{th}$ piece of multimedia information is complete, switches the status corresponding to the $i^{th}$ piece of multimedia information to a dynamic presentation mode, and plays the $i^{th}$ piece of multimedia information, i being a positive integer, and i being greater than or equal to 1. In this way, a second aspect of the technical effects is achieved: Because before being finally presented dynamically and in a loading process of the $i^{th}$ piece of multimedia information, the $i^{th}$ piece of multimedia information that has been loaded seems to be a static picture visually from the perspective of a user, the user feels different in a process of switching from a static picture to a dynamic video. Therefore, according to this technology, the user is more interested in and focuses more on information presented when the $i^{th}$ piece of multimedia information is being played, thereby better facilitating information sharing and promotion. After detecting that playing of the $i^{th}$ piece of multimedia information ends, the terminal extracts an $(i+1)^{th}$ piece of multimedia information from the specified storage area in sequence, and switches to play the $(i+1)^{th}$ piece of multimedia information. In this way, a third aspect of the technical effects is achieved: The switch is an automatic seamless switch; multiple videos can be switched, exactly without requiring a manual intervention from a user (for example, initiating a video switching operation by the user) in this switch process; and the multiple videos are continuously played with no playing interval. Therefore, playing is smoother, there is no playing interval between multiple videos, and the user can always obtain an information presentation result and focus more on information sharing during information presentation. The terminal generates an interaction screen by means of simulation after detecting that playing of the $(i+1)^{th}$ piece of multimedia information ends, the interaction screen including a touch interaction object for enabling an $(i+2)^{th}$ piece of multimedia information; responds to a first operation performed on the touch interaction object; extracts the $(i+2)^{th}$ piece of multimedia information from the specified storage area in sequence; and switches to play the $(i+2)^{th}$ piece of multimedia information. In this way, a fourth aspect of the technical effects is achieved: The interaction screen and the touch interaction object that is on the screen and that is used for enabling the $(i+2)^{th}$ piece of multimedia information are generated by means of simulation. That is, an interactive session is added. Therefore, interactivity is provided during information presentation, thereby providing good interactivity between a user and presented information, and better facilitating information sharing and promotion.

The example of FIG. 1 is only a system architecture example of the embodiments of the present invention. The embodiments of the present invention are not limited to the system structure in FIG. 1. Based on the system architecture, the following embodiments of the present invention are provided.

Embodiment 1

Figure 2:
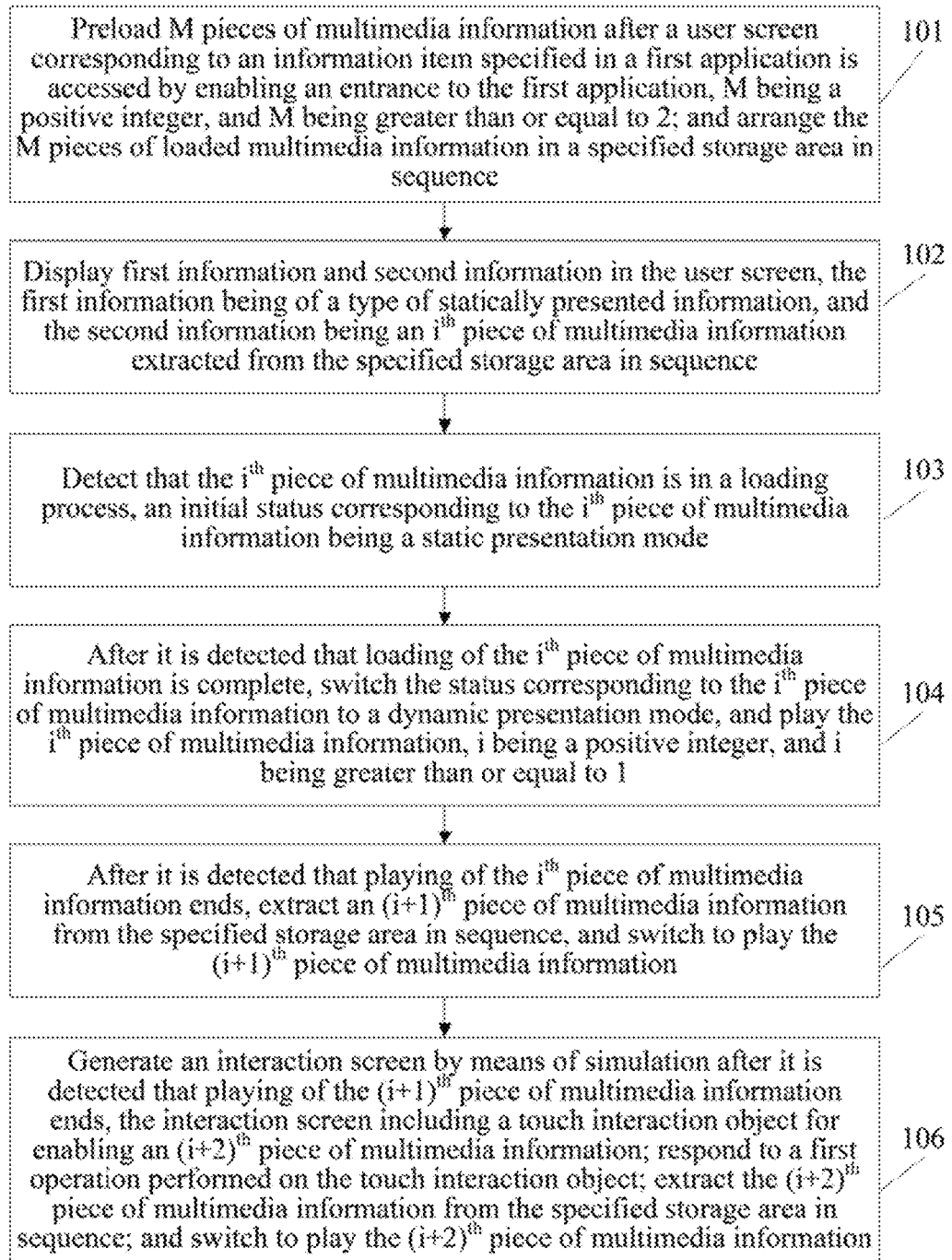
FIG. 2 is a flowchart of an implementation according to Embodiment 1 of the present invention.

This embodiment of the present invention provides an information processing method. As shown in FIG. 2, the method includes the following steps:

Step 101: Preload M pieces of multimedia information after a user screen corresponding to an information item specified in a first application is accessed by enabling an entrance to the first application, M being a positive integer, and M being greater than or equal to 2; and arrange the M pieces of loaded multimedia information in a specified storage area in sequence.

Figure 3:
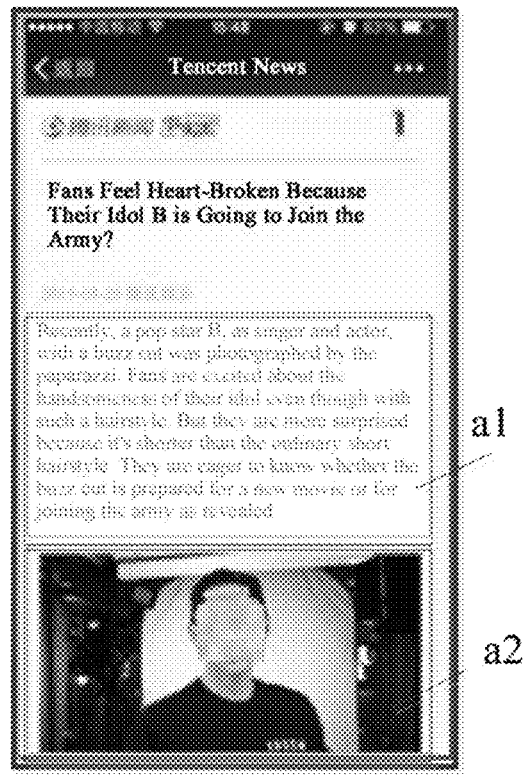
FIGS. 3-6 are multiple schematic scenario diagrams of an actual application applying the embodiments of the present invention.

For example, the first application is a news application, and the news application includes multiple news items such as news headlines and hot issues. A news display page corresponding to a specific news item of the news application is accessed. As shown in FIG. 3, information on the news display page is presented on the news display page by means of static text plus a dynamic video (before the loading of the video is complete, a static picture is displayed on the news display page, and after loading of the video is complete, the video is switched from an initial "static picture" to a "dynamic video" during playing, where the static picture indicates a display status before loading is complete, and the dynamic video indicates a display status after loading is complete). The news display page includes text information (which is used as a specific example of first information described in step 102, and is the static text) that is of news content and that is shown in a first box a1, and further includes video information (which is used as a specific example of second information described in step 102, and is the dynamic video) that is of the news content and that is shown in a second box a2. During actual application of this embodiment of the present invention, the first box a1 and the second box a2 do not exist. For clear description only, the two boxes are provided to indicate and distinguish between different information types presented on a same news page.

Figure 4:
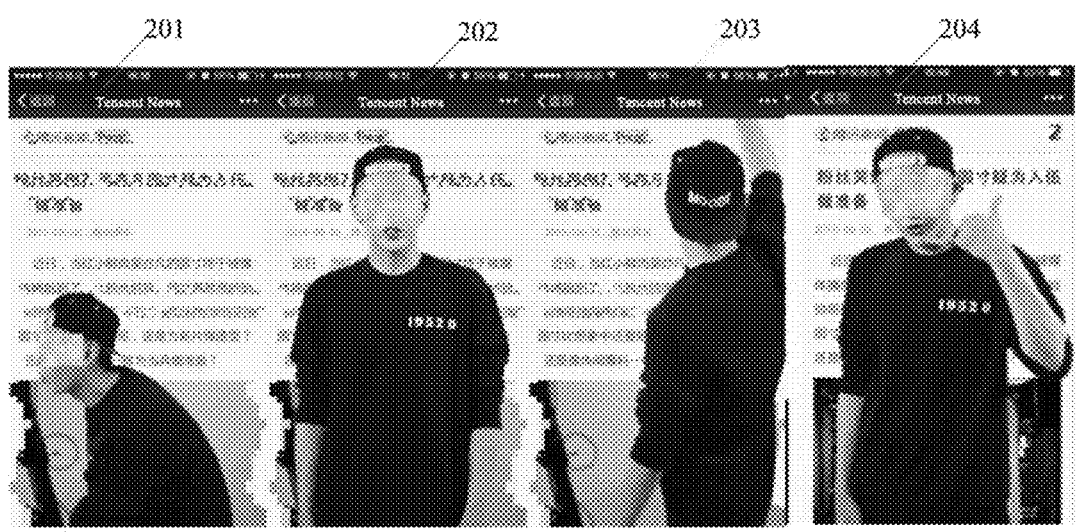
Figure 5:
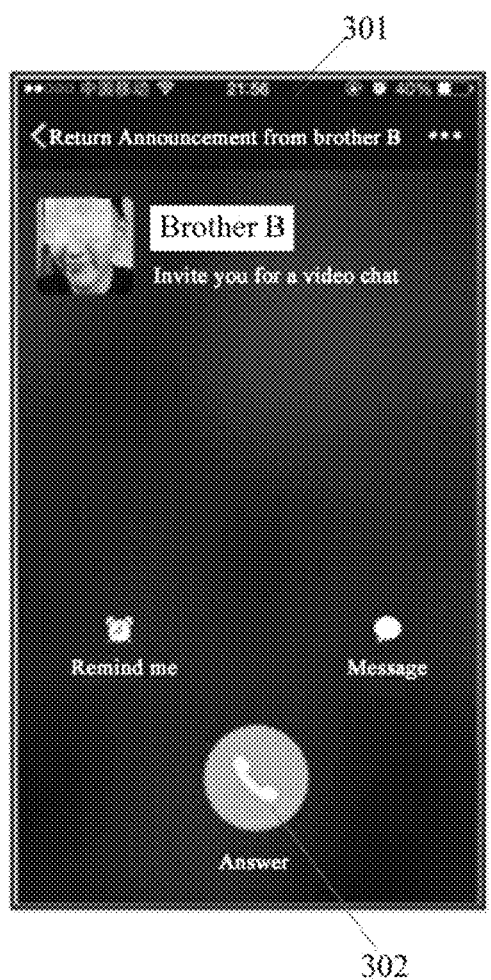
Figure 6:
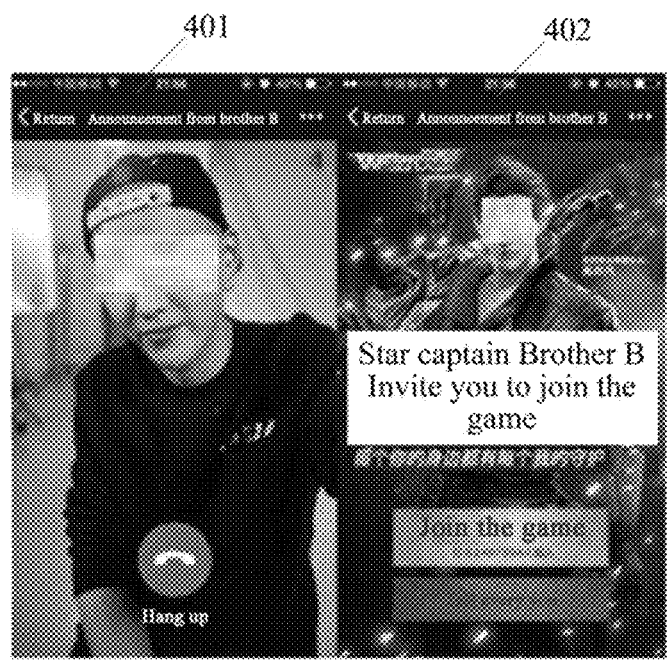

For example, three videos may be configured and preloaded according to an information sharing requirement. A first video may be the video information in the position identified by the second box a2 in FIG. 3, and a specified character, for example, "brother B", in a specific scenario interprets the text information in the position identified by the first box a1. A second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of a third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application "We Fire rather than join the army," and the like.

Step 102: Display first information and second information on the user screen, the first information being of a type of statically presented information, and the second information being an $i^{th}$ piece of multimedia information extracted from the specified storage area in sequence.

Herein, the example in which the first application is the news application is used. The first information is, for example, the text information in the position identified by the first box a1 in FIG. 3, for example, a piece of news content "Brother B is to join the army". The second information is, for example, the video information "Brother B personally interprets whether he is to join the army" that may change from a type of statically presented information to a type of dynamically presented information in the position identified by the second box a2 in FIG. 3.

Herein, the example in which three videos are configured and preloaded according to an information sharing requirement is still used. The three videos may be stored in a specified position (the specified storage area), for example, a memory or a storage card of a mobile phone, and may be stored in sequence or in another storage manner, provided that video information can be identified and that a first video, a second video, and a third video can be correctly extracted.

Step 103: Detect that the $i^{th}$ piece of multimedia information is in a loading process, an initial status corresponding to the $i^{th}$ piece of multimedia information being a static presentation mode.

Herein, during initial loading and when loading is not complete, the first video is in a static presentation mode and seems to be a picture. It may be said that the first video is formed by a specific frame of static picture in the first video. A video includes multiple video frames, and multiple video frames form a dynamic video for presentation.

Step 104: After it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1.

Herein, after loading is complete, multiple video frames form a dynamic video for presentation, and a static presentation mode is switched to a dynamic presentation mode. In this case, it can be seen that the picture is actually a video. The first video is played.

Step 105: After it is detected that playing of the $i^{th}$ piece of multimedia information ends, extract an $(i+1)^{th}$ piece of multimedia information from the specified storage area in sequence, and switch to play the $(i+1)^{th}$ piece of multimedia information.

Herein, after it is detected that playing of the first video ends, the second video is extracted from the specified storage area in sequence, and the second video is played by means of a seamless switch. How a front end processing technology of a seamless switch between videos on a terminal is implemented between the first video and the second video is described in a subsequent embodiment. Details are not described herein.

Step 106: Generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Herein, after it is detected that playing of the second video ends, an interaction screen (the chat screen simulating that in WeChat in FIG. 5) is generated by means of simulation. The interaction screen includes a touch interaction object (for example, the answer button in FIG. 5) for enabling the third video; a first operation performed on the touch interaction object (for example, the answer button in FIG. 5) is responded to; the third video is extracted from the specified storage area in sequence; and the third video is switched to for playing.

The foregoing specific scenarios and specific video page presentation are only used as examples. This embodiment is not limited to these specific scenarios and page presentation. In this embodiment, a seamless switch between a first video and a second video enables smooth continuous playing of multiple videos; and a simulated interaction screen and a touch interaction object are introduced in a switch process between the second video and a third video, to implement switching between multiple videos. In the whole process, information can be quickly shared and widely spread by using a series of technical means such as presenting information in a diversified manner, a status change of information, a switch between multiple pieces of information, and interaction between information.

Embodiment 2

Figure 7:
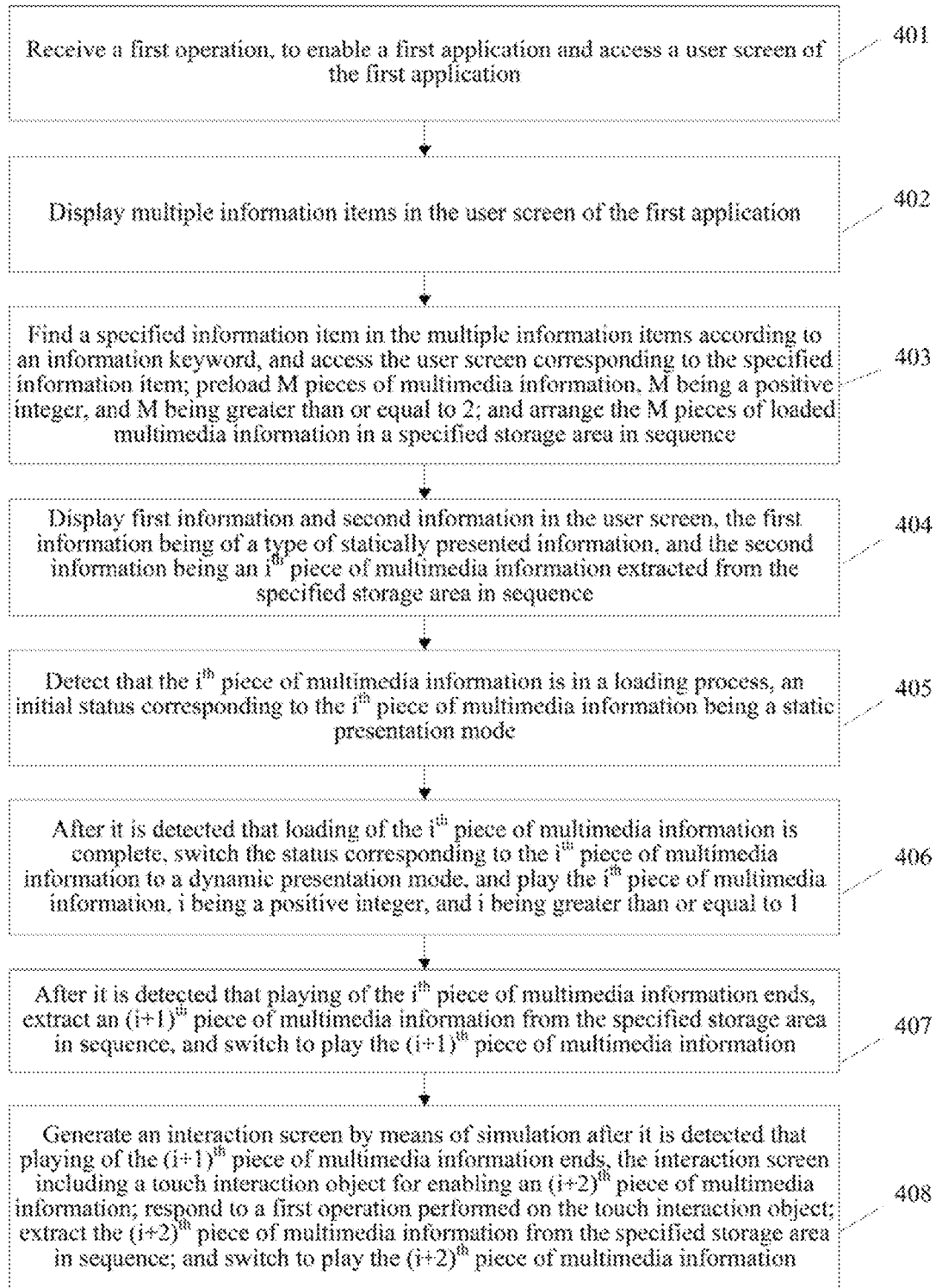
FIG. 7 is a flowchart of an implementation according to Embodiment 2 of the present invention.

This embodiment of the present invention provides an information processing method. As shown in FIG. 7, the method includes the following steps:

Step 401: Receive a first operation to enable a first application and access a user screen of the first application.

Step 402: Display multiple information items on the user screen of the first application.

Herein, an example in which the first application is a news application is used. A user enables the news application, finds, from many pieces of news, a news item that a character "brother B" joins the army, and then access the screen.

Step 403: Find the specified information item in the multiple information items according to an information keyword, and access a user screen corresponding to the specified information item; preload M pieces of multimedia information, M being a positive integer, and M being greater than or equal to 2; and arrange the M pieces of loaded multimedia information in a specified storage area in sequence.

Herein, an example in which the first application is a news application is used, where the news application includes multiple news items such as news headlines and hot issues.

A news display page corresponding to a specific news item of the news application is accessed. As shown in FIG. 3, information on the news display page is presented on the news display page by means of static text plus a dynamic video (before loading of the video is complete, a static picture is displayed on the news display page, and after loading of the video is complete, the video is switched from an initial "static picture" to a "dynamic video" during playing, where the static picture indicates a display status before loading is complete, and the dynamic video indicates a display status after loading is complete). The news display page includes text information (which is used as a specific example of first information described in step 404, and is the static text) that is of news content and that is shown in a first box a1, and further includes video information (which is used as a specific example of second information described in step 404, and is the dynamic video) that is of the news content and that is shown in a second box a2. During actual application of this embodiment of the present invention, the first box a1 and the second box a2 do not exist. For clear description only, the two boxes are provided to indicate and distinguish between different information types presented on a same news page.

For example, three videos may be configured and preloaded according to an information sharing requirement. A first video may be the video information in the position identified by the second box a2 in FIG. 3, and a specified character "brother B" in a specific scenario interprets the text information in the position identified by the first box a1. A second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of a third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application "We Fire rather than join the army," and the like.

Step 404: Display first information and second information in the user screen, the first information being of a type of statically presented information, and the second information being an $i^{th}$ piece of multimedia information extracted from the specified storage area in sequence.

Herein, the example in which the first application is the news application is used. The first information is, for example, the text information in the position identified by the first box a1 in FIG. 3, for example, a piece of news content "Brother B is to join the army". The second information is, for example, the video information "Brother B personally interprets whether he is to join the army" that may change from a type of statically presented information to a type of dynamically presented information in the position identified by the second box a2 in FIG. 3.

Herein, the example in which three videos are configured and preloaded according to an information sharing requirement is still used. The three videos may be stored in a specified position (the specified storage area), for example, a memory or a storage card of a mobile phone, and may be stored in sequence or in another storage manner, provided that video information can be identified and that a first video, a second video, and a third video can be correctly extracted.

Step 405: Detect that the $i^{th}$ piece of multimedia information is in a loading process, an initial status corresponding to the $i^{th}$ piece of multimedia information being a static presentation mode.

Herein, during initial loading and when loading is not complete, the first video is in a static presentation mode and seems to be a picture. It may be said that the first video is formed by a frame of static picture in the first video. A video includes multiple video frames, and multiple video frames form a dynamic video for presentation.

Step 406: After it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1.

Herein, after loading is complete, multiple video frames for a dynamic video for presentation, and a static presentation mode is switched to a dynamic presentation mode. In this case, it can be seen that the picture is actually a video. The first video is played.

Step 407: After it is detected that playing of the $i^{th}$ piece of multimedia information ends, extract an $(i+1)^{th}$ piece of multimedia information from the specified storage area in sequence, and switch to play the $(i+1)^{th}$ piece of multimedia information.

Herein, after it is detected that playing of the first video ends, the second video is extracted from the specified storage area in sequence, and the second video is played by means of a seamless switch. How a front end processing technology of a seamless switch between videos on a terminal is implemented between the first video and the second video is described in a subsequent embodiment. Details are not described herein.

Step 408: Generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Herein, after it is detected that playing of the second video ends, an interaction screen (the chat screen simulating that in WeChat in FIG. 5) is generated by means of simulation. The interaction screen includes a touch interaction object (for example, the answer button in FIG. 5) for enabling the third video; a first operation performed on the touch interaction object (for example, the answer button in FIG. 5) is responded to; the third video is extracted from the specified storage area in sequence; and the third video is switched to for playing.

The foregoing specific scenarios and specific video page presentation are only used as examples. This embodiment is not limited to these specific scenarios and page presentation.

In this embodiment, a seamless switch between a first video and a second video enables smooth continuous playing of multiple videos; and a simulated interaction screen and a touch interaction object are introduced in a switch process between the second video and a third video, to implement switching between multiple videos. In the whole process, information can be quickly shared and widely spread by using a series of technical means such as presenting information in a diversified manner, a status change of information, a switch between multiple pieces of information, and interaction between information.

Embodiment 3

Figure 8:
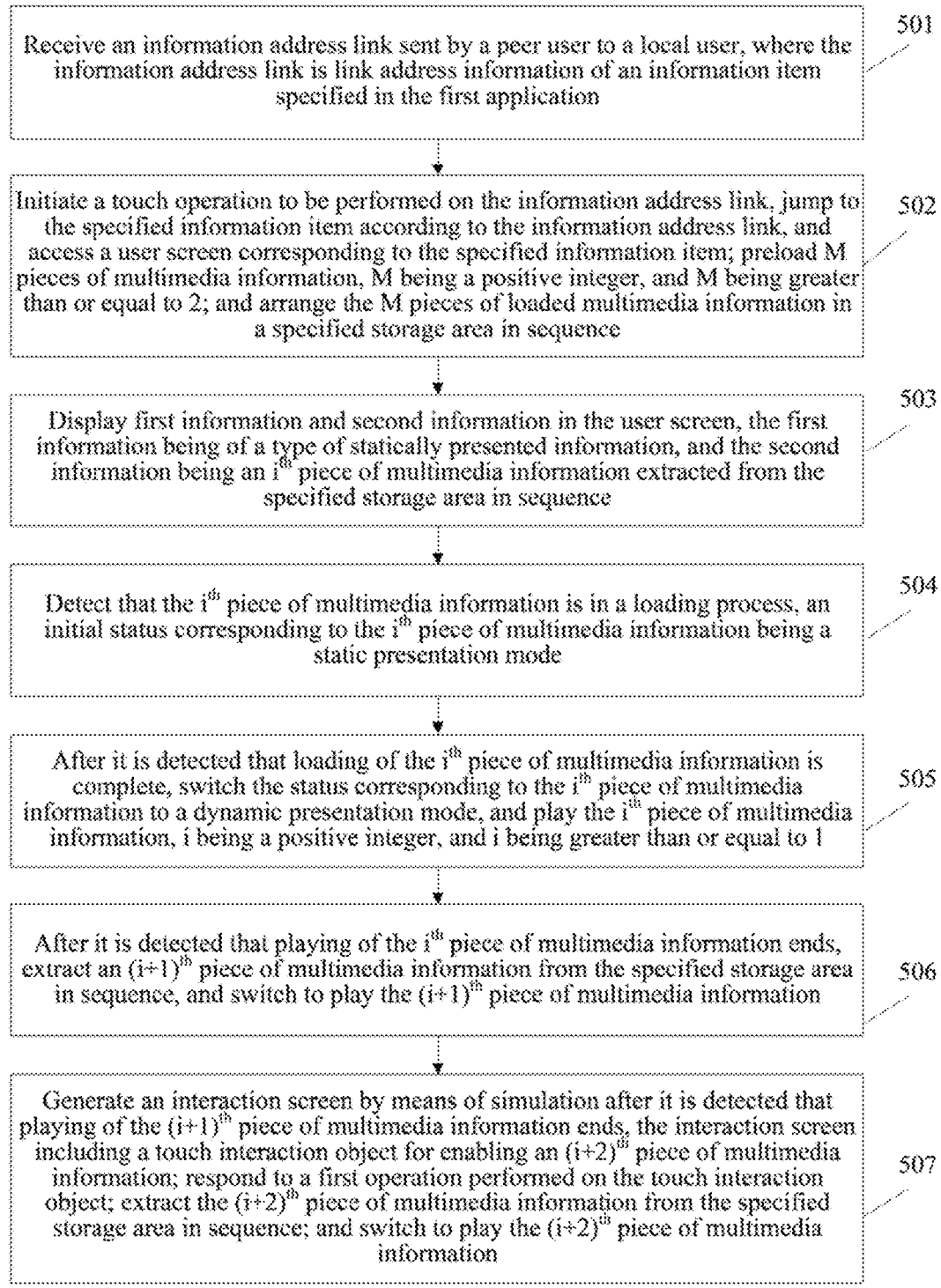
FIG. 8 is a flowchart of an implementation according to Embodiment 3 of the present invention.

This embodiment of the present invention provides an information processing method. As shown in FIG. 8, the method includes the following steps:

Step 501: Receive an information address link sent by a peer user to a local user, the information address link being link address information of an information item specified in a first application.

Figure 9:
FIG. 9 and FIG. 10 are multiple schematic scenario diagrams of an actual application applying Embodiment 3 of the present invention.
Figure 10:
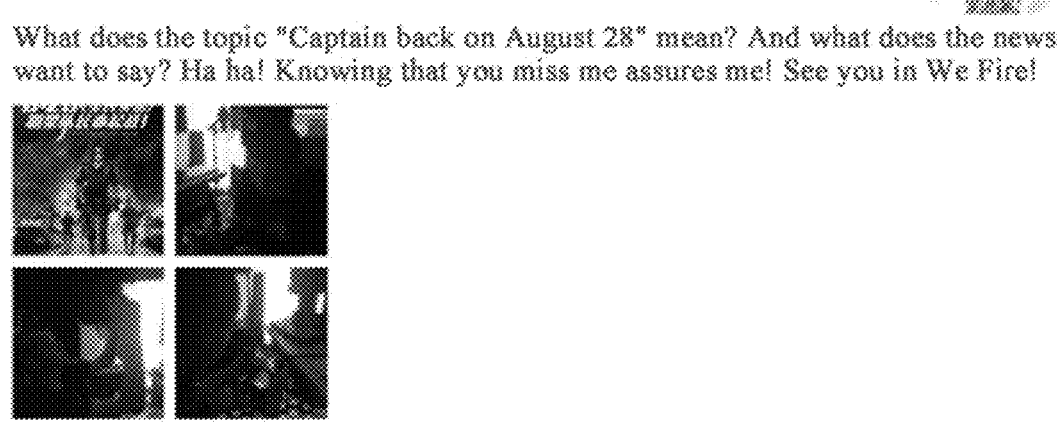

Herein, an example in which the first application is a news application is used. A user accesses a user screen corresponding to the specified information item by using a news address link recommended by a friend, or accesses a user screen corresponding to the specified information item by using an information link in WeChat Moments, as shown in FIG. 9 or FIG. 10.

Step 502: Initiate a touch operation to be performed on the information address link, jump to the specified information item according to the information address link, and access a user screen corresponding to the specified information item; preload M pieces of multimedia information, M being a positive integer, and M being greater than or equal to 2; and arrange the M pieces of loaded multimedia information in a specified storage area in sequence.

Herein, an example in which the first application is a news application is used, where the news application includes multiple news items such as news headlines and hot issues. A news display page corresponding to a specific news item of the news application is accessed. As shown in FIG. 3, information on the news display page is presented on the news display page by means of static text plus a dynamic video (before loading of the video is complete, a static picture is displayed on the news display page, and after loading of the video is complete, the video is switched from an initial "static picture" to a "dynamic video" during playing, where the static picture indicates a display status before loading is complete, and the dynamic video indicates a display status after loading is complete). The news display page includes text information (which is used as a specific example of first information described in step 503, and is the static text) that is of news content and that is shown in a first box a1, and further includes video information (which is used as a specific example of second information described in step 503, and is the dynamic video) that is of the news content and that is shown in a second box a2. During actual application of this embodiment of the present invention, the first box a1 and the second box a2 do not exist. For clear description only, the two boxes are provided to indicate and distinguish between different information types presented on a same news page.

For example, three videos may be configured and preloaded according to an information sharing requirement. A first video may be the video information in the position identified by the second box a2 in FIG. 3, and a specified character, for example, "brother B", in a specific scenario interprets the text information in the position identified by the first box a1. A second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of a third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application We Fire rather than join the army, and the like.

Step 503: Display first information and second information in the user screen, the first information being of a type of statically presented information, and the second information being an $i^{th}$ piece of multimedia information extracted from the specified storage area in sequence.

Herein, the example in which the first application is the news application is used. The first information is, for example, the text information in the position identified by the first box a1 in FIG. 3, for example, a piece of news content "Brother B is to join the army". The second information is, for example, the video information "Brother B personally interprets whether he is to join the army" that may change from a type of statically presented information to a type of dynamically presented information in the position identified by the second box a2 in FIG. 3.

Herein, the example in which three videos are configured and preloaded according to an information sharing requirement is still used. The three videos may be stored in a specified position (the specified storage area), for example, a memory or a storage card of a mobile phone, and may be stored in sequence or in another storage manner, provided that video information can be identified and that a first video, a second video, and a third video can be correctly extracted.

Step 504: Detect that the $i^{th}$ piece of multimedia information is in a loading process, an initial status corresponding to the $i^{th}$ piece of multimedia information being a static presentation mode.

Herein, during initial loading and when loading is not complete, the first video is in a static presentation mode and seems to be a picture. It may be said that the first video is formed by a frame of static picture in the first video. A video includes multiple video frames, and multiple video frames form a dynamic video for presentation.

Step 505: After it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1.

Herein, after loading is complete, multiple video frames for a dynamic video for presentation, and a static presentation mode is switched to a dynamic presentation mode. In this case, it can be seen that the picture is actually a video. The first video is played.

Step 506: After it is detected that playing of the $i^{th}$ piece of multimedia information ends, extract an $(i+1)^{th}$ piece of multimedia information from the specified storage area in sequence, and switch to play the $(i+1)^{th}$ piece of multimedia information.

Herein, after it is detected that playing of the first video ends, the second video is extracted from the specified storage area in sequence, and the second video is played by means of a seamless switch. How a front end processing technology of a seamless switch between videos on a terminal is implemented between the first video and the second video is described in a subsequent embodiment. Details are not described herein.

Step 507: Generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Herein, after it is detected that playing of the second video ends, an interaction screen (the chat screen simulating that in WeChat in FIG. 5) is generated by means of simulation. The interaction screen includes a touch interaction object (for example, the answer button in FIG. 5) for enabling the third video; a first operation performed on the touch interaction object (for example, the answer button in FIG. 5) is responded to; the third video is extracted from the specified storage area in sequence; and the third video is switched to for playing.

The foregoing specific scenarios and specific video page presentation are only used as examples. This embodiment is not limited to these specific scenarios and page presentation. In this embodiment, a seamless switch between a first video and a second video enables smooth continuous playing of multiple videos; and a simulated interaction screen and a touch interaction object are introduced in a switch process between the second video and a third video, to implement switching between multiple videos. In the whole process, information can be quickly shared and widely spread by using a series of technical means such as presenting information in a diversified manner, a status change of information, a switch between multiple pieces of information, and interaction between information.

Embodiment 4

Figure 11:
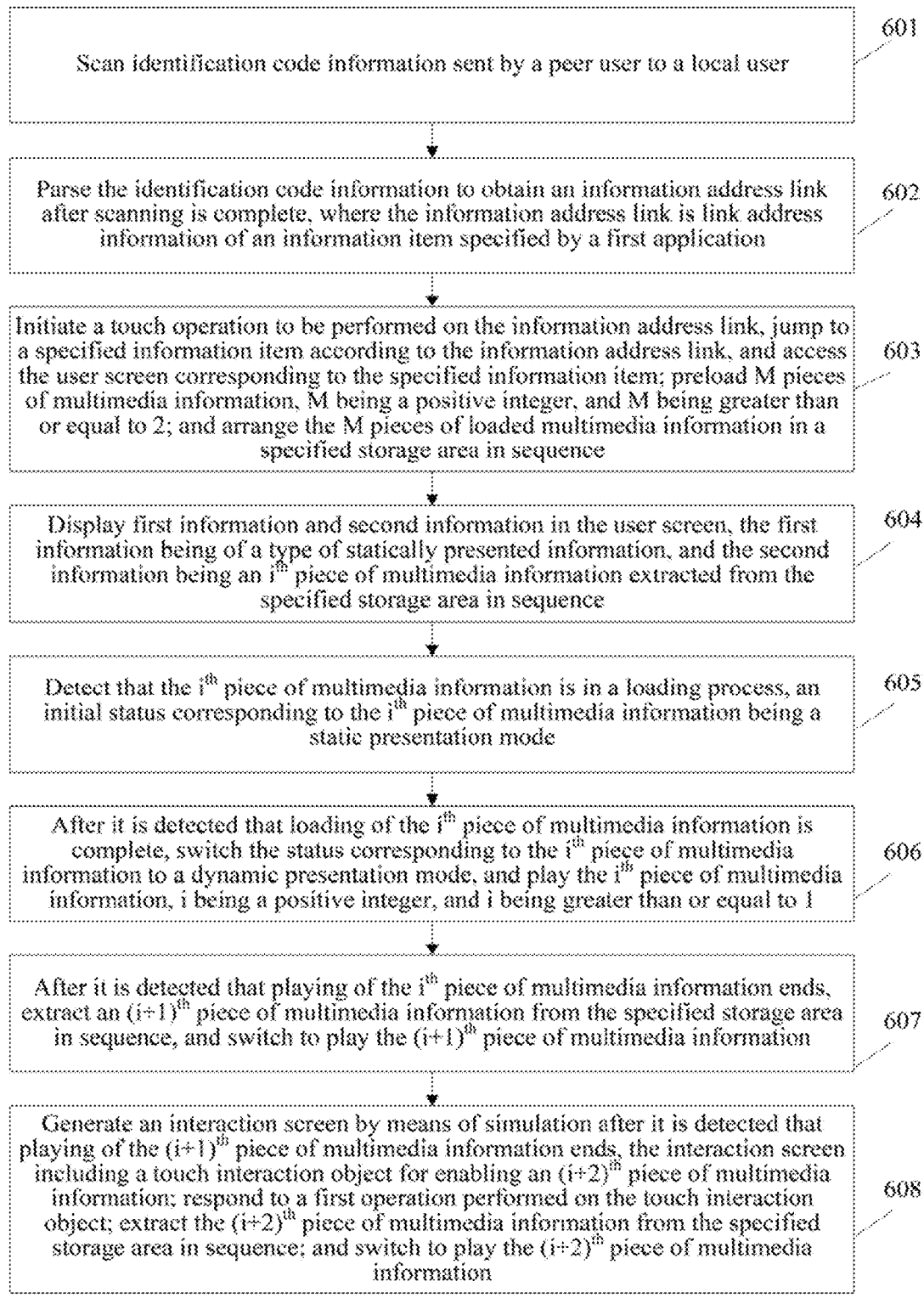
FIG. 11 is a flowchart of an implementation according to Embodiment 4 of the present invention.

This embodiment of the present invention provides an information processing method. As shown in FIG. 11, the method includes the following steps:

Step 601: Scan identification code information sent by a peer user to a local user.

Step 602: Parse the identification code information to obtain an information address link after scanning is complete, the information address link being link address information of an information item specified by a first application.

Figure 12:
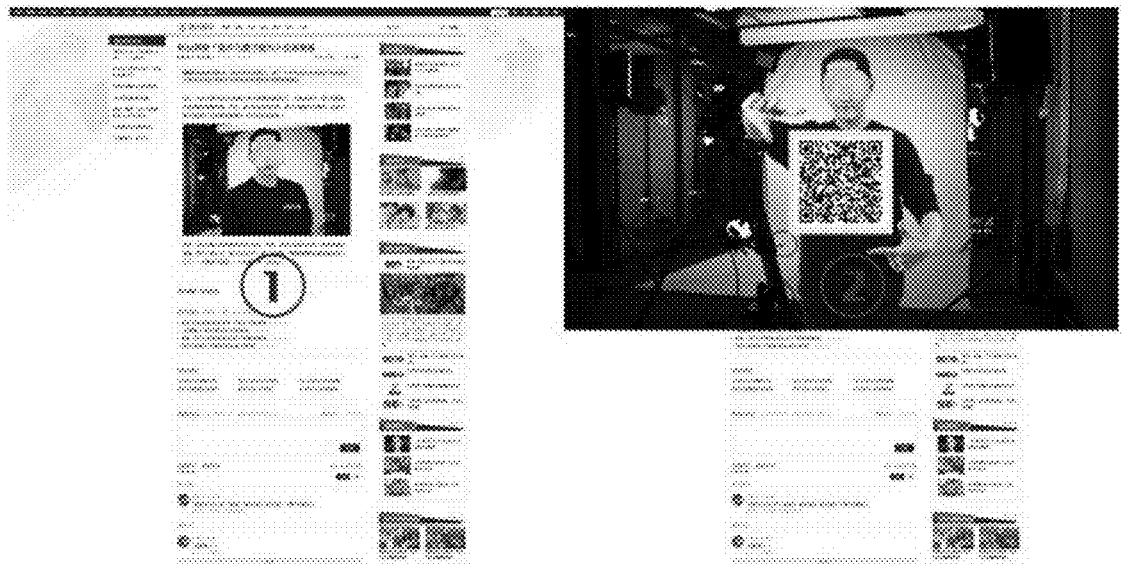
FIG. 12 is a schematic scenario diagram of an actual application applying Embodiment 4 of the present invention.

Herein, an example in which the first application is a news application is used. A user may access the screen by scanning quick response code on a PC terminal, or the like. FIG. 12 shows a page of scanning quick response code on a PC terminal.

Step 603: Initiate a touch operation to be performed on the information address link, jump to the specified information item according to the information address link, and access the user screen corresponding to the specified information item; preload M pieces of multimedia information, M being a positive integer, and M being greater than or equal to 2; and arrange the M pieces of loaded multimedia information in a specified storage area in sequence.

Herein, an example in which the first application is a news application is used, where the news application includes multiple news items such as news headlines and hot issues. A news display page corresponding to a specific news item of the news application is accessed. As shown in FIG. 3, information on the news display page is presented on the news display page by means of static text plus a dynamic video (before loading of the video is complete, a static picture is displayed on the news display page, and after loading of the video is complete, the video is switched from an initial "static picture" to a "dynamic video" during playing, where the static picture indicates a display status before loading is complete, and the dynamic video indicates a display status after loading is complete). The news display page includes text information (which is used as a specific example of first information described in step 604, and is the static text) that is of news content and that is shown in a first box a1, and further includes video information (which is used as a specific example of second information described in step 604, and is the dynamic video) that is of the news content and that is shown in a second box a2. During actual application of this embodiment of the present invention, the first box a1 and the second box a2 do not exist. For clear description only, the two boxes are provided to indicate and distinguish between different information types presented on a same news page.

For example, three videos may be configured and preloaded according to an information sharing requirement. A first video may be the video information in the position identified by the second box a2 in FIG. 3, and a specified character, for example, "brother B", in a specific scenario interprets the text information in the position identified by the first box a1. A second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of a third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application We Fire rather than join the army, and the like.

Step 604: Display first information and second information in the user screen, the first information being of a type of statically presented information, and the second information being an $i^{th}$ piece of multimedia information extracted from the specified storage area in sequence.

Herein, the example in which the first application is the news application is used. The first information is, for example, the text information in the position identified by the first box a1 in FIG. 3, for example, a piece of news content "Brother B is to join the army". The second information is, for example, the video information "Brother B personally interprets whether he is to join the army" that may change from a type of statically presented information to a type of dynamically presented information in the position identified by the second box a2 in FIG. 3.

Herein, the example in which three videos are configured and preloaded according to an information sharing requirement is still used. The three videos may be stored in a specified position (the specified storage area), for example, a memory or a storage card of a mobile phone, and may be stored in sequence or in another storage manner, provided that video information can be identified and that a first video, a second video, and a third video can be correctly extracted.

Step 605: Detect that the $i^{th}$ piece of multimedia information is in a loading process, an initial status corresponding to the $i^{th}$ piece of multimedia information being a static presentation mode.

Herein, during initial loading and when loading is not complete, the first video is in a static presentation mode and seems to be a picture. It may be said that the first video is formed by a frame of static picture in the first video. A video includes multiple video frames, and multiple video frames form a dynamic video for presentation.

Step 606: After it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1.

Herein, after loading is complete, multiple video frames for a dynamic video for presentation, and a static presentation mode is switched to a dynamic presentation mode. In this case, it can be seen that the picture is actually a video. The first video is played.

Step 607: After it is detected that playing of the $i^{th}$ piece of multimedia information ends, extract an $(i+1)^{th}$ piece of multimedia information from the specified storage area in sequence, and switch to play the $(i+1)^{th}$ piece of multimedia information.

Herein, after it is detected that playing of the first video ends, the second video is extracted from the specified storage area in sequence, and the second video is played by means of a seamless switch. How a front end processing technology of a seamless switch between videos on a terminal is implemented between the first video and the second video is described in a subsequent embodiment. Details are not described herein.

Step 608: Generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Herein, after it is detected that playing of the second video ends, an interaction screen (the chat screen simulating that in WeChat in FIG. 5) is generated by means of simulation. The interaction screen includes a touch interaction object (for example, the answer button in FIG. 5) for enabling the third video; a first operation performed on the touch interaction object (for example, the answer button in FIG. 5) is responded to; the third video is extracted from the specified storage area in sequence; and the third video is switched to for playing.

The foregoing specific scenarios and specific video page presentation are only used as examples. This embodiment is not limited to these specific scenarios and page presentation. In this embodiment, a seamless switch between a first video and a second video enables smooth continuous playing of multiple videos; and a simulated interaction screen and a touch interaction object are introduced in a switch process between the second video and a third video, to implement switching between multiple videos. In the whole process, information can be quickly shared and widely spread by using a series of technical means such as presenting information in a diversified manner, a status change of information, a switch between multiple pieces of information, and interaction between information.

Embodiment 5

This embodiment of the present invention provides an information processing method. Based on Embodiment 1 to Embodiment 4, after it is detected that playing of the $i^{th}$ piece of multimedia information ends, the extracting an $(i+1)^{th}$ piece of multimedia information from the specified storage area in sequence, and switching to play the $(i+1)^{th}$ piece of multimedia information includes: obtaining system configuration information of a terminal, and detecting, according to the system configuration information, whether the terminal uses a first operating system; and if the terminal uses the first operating system, switching from the $i^{th}$ piece of multimedia information to the $(i+1)^{th}$ piece of multimedia information for playing, according to a first policy; otherwise, switching from the $i^{th}$ piece of multimedia information to the $(i+1)^{th}$ piece of multimedia information for playing, according to a second policy.

In a specific application of this embodiment of the present invention, the first operating system may be an iOS system, and a non-first operating system may be a second operating system, for example, an Android system. The two different systems correspond to different implementations, that is, "how a front end processing technology of a seamless switch between videos on a terminal is implemented between the first video and the second video" described in the foregoing embodiments. Details are specifically described below.

For how a front end processing technology of a seamless switch between videos on a terminal is implemented between the first video and the second video, the technology is not limited to a switch between two videos, and may be a technology of a switch between multiple videos. That is, the extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information includes: obtaining system configuration information of a terminal, and detecting, according to the system configuration information, whether the terminal uses a first operating system; and if the terminal uses the first operating system, switching from the $i^{th}$ piece of multimedia information to the $(i+1)^{th}$ piece of multimedia information for playing, according to a first policy; otherwise, switching from the $i^{th}$ piece of multimedia information to the $(i+1)^{th}$ piece of multimedia information for playing, according to a second policy.

Specifically, monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, and switching to play the $(i+1)^{th}$ piece of multimedia information includes: monitoring playing progress of the $i^{th}$ piece of multimedia information by using an end event; after it is detected that playing of the $i^{th}$ piece of multimedia information ends, responding to the end event, and sending an instruction of playing the $(i+1)^{th}$ piece of multimedia information; switching back to the $(i+1)^{th}$ piece of multimedia information that has been loaded; and switching to play the $(i+1)^{th}$ piece of multimedia information.

Because processing for the iOS system and the Android system is different, different policies need to be used to implement a seamless switch between and playing of the $i^{th}$ piece of multimedia information and the $(i+1)^{th}$ piece of multimedia information.

Specifically, in an iOS system scenario, the $i^{th}$ piece of multimedia information is switched according to a first policy to the $(i+1)^{th}$ piece of multimedia information for playing, which specifically includes: monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, and switching to play the $(i+1)^{th}$ piece of multimedia information.

How the monitoring processing is specifically implemented? An example may be as follows:

The monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, and switching to play the $(i+1)^{th}$ piece of multimedia information includes: monitoring playing progress of the $i^{th}$ piece of multimedia information by using an end event; after it is detected that playing of the $i^{th}$ piece of multimedia information ends, responding to the end event, and sending an instruction of playing the $(i+1)^{th}$ piece of multimedia information; switching to the $(i+1)^{th}$ piece of multimedia information that has been loaded; and switching to play the $(i+1)^{th}$ piece of multimedia information.

Specifically, in an Android system scenario, the $i^{th}$ piece of multimedia information is switched according to a second policy to the $(i+1)^{th}$ piece of multimedia information for playing, which specifically includes: extracting the $(i+1)^{th}$ piece of multimedia information from the specified storage area in sequence, detecting whether there is a playing record for the $(i+1)^{th}$ piece of multimedia information, and pausing the $(i+1)^{th}$ piece of multimedia information if there is a playing record; monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, clearing the playing record to rewind to a start playing position of the $(i+1)^{th}$ piece of multimedia information, and switching to play the $(i+1)^{th}$ piece of multimedia information.

How the playing record is specifically detected? An example may be as follows:

The detecting whether there is a playing record for the $(i+1)^{th}$ piece of multimedia information, and pausing the $(i+1)^{th}$ piece of multimedia information if there is a playing record includes: detecting, by using a time update event, whether there is a playing record for the $(i+1)^{th}$ piece of multimedia information; if it is learnt, by means of detection, that a current playing time of the $(i+1)^{th}$ piece of multimedia information is greater than 0, it is detected that there is a playing record for the $(i+1)^{th}$ piece of multimedia information; pausing the $(i+1)^{th}$ piece of multimedia information; and recording a current pause position of the $(i+1)^{th}$ piece of multimedia information as an end position of the playing record.

How the monitoring processing is specifically implemented? An example may be as follows:

The monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, clearing the playing record to rewind to a start playing position of the $(i+1)^{th}$ piece of multimedia information, and switching to play the $(i+1)^{th}$ piece of multimedia information includes: monitoring playing progress of the $i^{th}$ piece of multimedia information by using an end event; after it is detected that playing of the $i^{th}$ piece of multimedia information ends, responding to the end event, and sending an instruction of playing the $(i+1)^{th}$ piece of multimedia information; switching back to the $(i+1)^{th}$ piece of multimedia information that has been paused; clearing the end position of the playing record; and rewind to the start playing position of the $(i+1)^{th}$ piece of multimedia information, to switch to play the $(i+1)^{th}$ piece of multimedia information.

In conclusion, a seamless switch between and playing of multiple videos can be implemented by means of different processing. Two videos are used as an example. For example, in the iOS system, after a page is accessed, two videos can be directly preloaded without any trigger condition. After loading is complete and playing of a first video ends, a second video may be successively played. While in the Android system, after a page is accessed, two videos may be preloaded by using a trigger condition such as scrolling up or down by a specific height in a news page or by means of triggering by another touch or sliding operation. When the two videos are being loaded, a second video needs to be played for a short time period and then is paused and saved. In this way, the second video can be played automatically after playing of a first video ends. In this case, the second video is rewound to an initial playing position from a position at which the second video is paused, and then is played. Because the Android system is different from the iOS system, even though both of the two videos are loaded at the beginning, if one of the videos has not been played, after playing of the first video ends, the second video cannot be automatically played, and a manual intervention is necessary. However, in the present disclosure, no manual intervention is required, and the whole process of this embodiment is implemented by means of an automatic switch operation.

Embodiment 6

Figure 13:
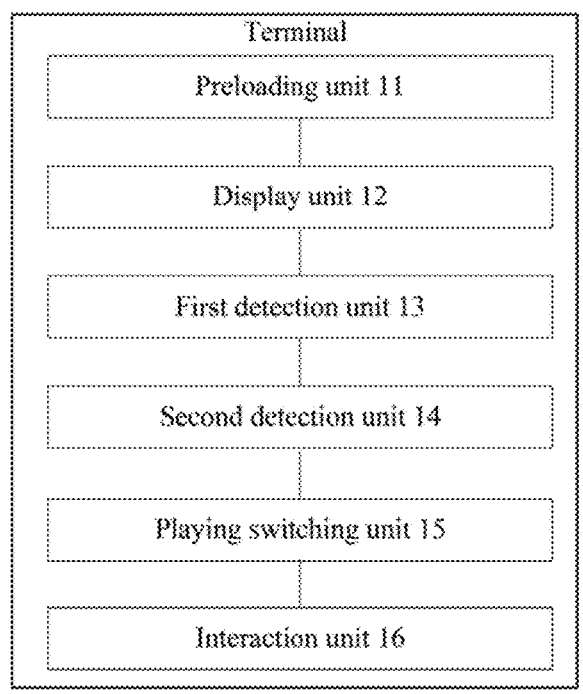
FIG. 13 is a schematic structural diagram of a composition according to Embodiment 6 of the present invention.

This embodiment of the present invention provides a terminal. As shown in FIG. 13, the terminal includes:

a preloading unit 11, configured to: preload M pieces of multimedia information after a user screen corresponding to an information item specified in a first application is accessed by enabling an entrance to the first application, M being a positive integer, and M being greater than or equal to 2; and arrange the M pieces of loaded multimedia information in a specified storage area in sequence;

a display unit 12, configured to display first information and second information in the user screen, the first information being of a type of statically presented information, and the second information being an $i^{th}$ piece of multimedia information extracted from the specified storage area in sequence;

a first detection unit 13, configured to detect that the $i^{th}$ piece of multimedia information is in a loading process, an initial status corresponding to the $i^{th}$ piece of multimedia information being a static presentation mode;

a second detection unit 14, configured to: after it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1;

a playing switching unit 15, configured to: after it is detected that playing of the $i^{th}$ piece of multimedia information ends, extract an $(i+1)^{th}$ piece of multimedia information from the specified storage area in sequence, and switch to play the $(i+1)^{th}$ piece of multimedia information; and an interaction unit 16, configured to: generate an interaction screen by means of simulation after it is detected that playing of the $(i+1)^{th}$ piece of multimedia information ends, the interaction screen including a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

Herein, an example in which the first application is a news application is used, where the news application includes multiple news items such as news headlines and hot issues. A news display page corresponding to a specific news item of the news application is accessed. As shown in FIG. 3, information on the news display page is presented on the news display page by means of static text plus a dynamic video (before loading of the video is complete, a static picture is displayed on the news display page, and after loading of the video is complete, the video is switched from an initial "static picture" to a "dynamic video" during playing, where the static picture indicates a display status before loading is complete, and the dynamic video indicates a display status after loading is complete). The news display page includes text information (which is used as a specific example of first information described in step 102, and is the static text) that is of news content and that is shown in a first box a1, and further includes video information (which is used as a specific example of second information described in step 102, and is the dynamic video) that is of the news content and that is shown in a second box a2. During actual application of this embodiment of the present invention, the first box a1 and the second box a2 do not exist. For clear description only, the two boxes are provided to indicate and distinguish between different information types presented on a same news page.

For example, three videos may be configured and preloaded according to an information sharing requirement. A first video may be the video information in the position identified by the second box a2 in FIG. 3, and a specified character, for example, "brother B", in a specific scenario interprets the text information in the position identified by the first box a1. A second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of a third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application We Fire rather than join the army, and the like.

Herein, the example in which the first application is the news application is used. The first information is, for example, the text information in the position identified by the first box a1 in FIG. 3, for example, a piece of news content "Brother B is to join the army". The second information is, for example, the video information "Brother B personally interprets whether he is to join the army" that may change from a type of statically presented information to a type of dynamically presented information in the position identified by the second box a2 in FIG. 3.

Herein, the example in which three videos are configured and preloaded according to an information sharing requirement is still used. The three videos may be stored in a specified position (the specified storage area), for example, a memory or a storage card of a mobile phone, and may be stored in sequence or in another storage manner, provided that video information can be identified and that a first video, a second video, and a third video can be correctly extracted.

Herein, during initial loading and when loading is not complete, the first video is in a static presentation mode and seems to be a picture. It may be said that the first video is formed by a frame of static picture in the first video. A video includes multiple video frames, and multiple video frames form a dynamic video for presentation.

Herein, after loading is complete, multiple video frames for a dynamic video for presentation, and a static presentation mode is switched to a dynamic presentation mode. In this case, it can be seen that the picture is actually a video. The first video is played.

Herein, after it is detected that playing of the first video ends, the second video is extracted from the specified storage area in sequence, and the second video is played by means of a seamless switch.

Herein, after it is detected that playing of the second video ends, an interaction screen (the chat screen simulating that in WeChat in FIG. 5) is generated by means of simulation. The interaction screen includes a touch interaction object (for example, the answer button in FIG. 5) for enabling the third video; a first operation performed on the touch interaction object (for example, the answer button in FIG. 5) is responded to; the third video is extracted from the specified storage area in sequence; and the third video is switched to for playing.

The foregoing specific scenarios and specific video page presentation are only used as examples. This embodiment is not limited to these specific scenarios and page presentation. In this embodiment, a seamless switch between a first video and a second video enables smooth continuous playing of multiple videos; and a simulated interaction screen and a touch interaction object are introduced in a switch process between the second video and a third video, to implement switching between multiple videos. In the whole process, information can be quickly shared and widely spread by using a series of technical means such as presenting information in a diversified manner, a status change of information, a switch between multiple pieces of information, and interaction between information.

Embodiment 7

This embodiment of the present invention provides a terminal. Based on Embodiment 6, the terminal further includes a first processing unit, configured to: receive the first operation, to enable the first application and access a user screen of the first application; display multiple information items in the user screen of the first application; and find the specified information item in the multiple information items according to an information keyword, and access the user screen corresponding to the specified information item.

Embodiment 8

This embodiment of the present invention provides a terminal. Based on Embodiment 6, the terminal further includes a first processing unit, configured to: receive an information address link sent by a peer user to a local user, the information address link being link address information of the information item specified in the first application; and initiate a touch operation to be performed on the information address link, jump to the specified information item according to the information address link, and access the user screen corresponding to the specified information item.

Embodiment 9

This embodiment of the present invention provides a terminal. Based on Embodiment 6, the terminal further includes a first processing unit, configured to: scan identification code information sent by a peer user to a local user; parse the identification code information to obtain an information address link after scanning is complete, the information address link being link address information of the information item specified by the first application; and initiate a touch operation to be performed on the information address link, jump to the specified information item according to the information address link, and access the user screen corresponding to the specified information item.

Based on Embodiment 6 to Embodiment 9, according to the terminal of the embodiments of the present invention, the playing switching unit is further configured to: obtain system configuration information of a terminal, and detect, according to the system configuration information, whether the terminal uses a first operating system; and if the terminal uses the first operating system, switch from the $i^{th}$ piece of multimedia information to the $(i+1)^{th}$ piece of multimedia information for playing, according to a first policy; otherwise, switch from the $i^{th}$ piece of multimedia information to the $(i+1)^{th}$ piece of multimedia information for playing, according to a second policy.

Based on Embodiment 6 to Embodiment 9, according to the terminal of the embodiments of the present invention, the playing switching unit is further configured to: monitor a playing progress of the $i^{th}$ piece of multimedia information; and after it is detected that playing of the $i^{th}$ piece of multimedia information ends, extract the $(i+1)^{th}$ piece of multimedia information from the specified storage area in sequence, and switch to play the $(i+1)^{th}$ piece of multimedia information.

Based on Embodiment 6 to Embodiment 9, according to the terminal of the embodiments of the present invention, the playing switching unit is further configured to: extract the $(i+1)^{th}$ piece of multimedia information from the specified storage area in sequence, detect whether there is a playing record for the $(i+1)^{th}$ piece of multimedia information, and pause the $(i+1)^{th}$ piece of multimedia information if there is a playing record; monitor a playing progress of the $i^{th}$ piece of multimedia information; and after it is detected that playing of the $i^{th}$ piece of multimedia information ends, extract the $(i+1)^{th}$ piece of multimedia information from the specified storage area in sequence, clear the playing record to rewind to a start playing position of the $(i+1)^{th}$ piece of multimedia information, and switch to play the $(i+1)^{th}$ piece of multimedia information.

Embodiment 10

It should be noted herein that the foregoing terminal may be an electrical device such as a PC, or may be a portable electrical device such as a PAD, a tablet computer, or a handheld computer, or may be an intelligent mobile terminal such as a mobile phone, and is not limited thereto. The servers may be formed by using a cluster system and are electrical devices that are integrated or separately disposed for implementing functions of units. The terminal and the server each include at least a database for storing data and a processor for data processing, or include a storage medium disposed in the server or an independently disposed storage medium.

When performing processing, the processor for data processing may be implemented by using a microprocessor, a central processing unit (CPU, Central Processing Unit), a digital signal processor (DSP, Digital Signal Processor), or a field-programmable gate array (FPGA, Field-Programmable Gate Array). The storage medium includes an operation instruction. The operation instruction may be computer executable code, and the steps of the processes of the information processing methods in the embodiments of the present invention are performed by using the operation instruction.

Figure 14:
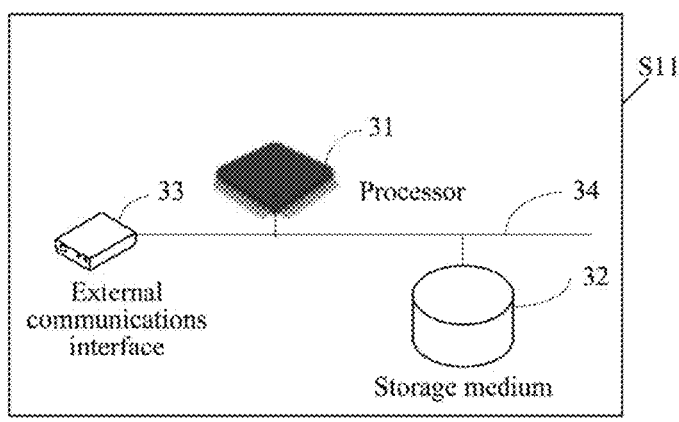
FIG. 14 is a schematic structural diagram of a hardware composition according to Embodiment 10 of the present invention.

An example of the terminal or the servers as a hardware entity S11 is shown in FIG. 14. The apparatus includes a processor 31, a storage medium 32, and at least one external communications interface 33. The processor 31, the storage medium 32, and the external communications interface 33 are connected by using a bus 34.

It should be noted that the description about the terminal is similar to that about the method, and beneficial effects are similar. Details are not described again. For technical details not disclosed in this terminal embodiment of the present invention, refer to the description of the method embodiments of the present invention.

An embodiment of the present invention further provides a computer storage medium, storing a computer executable instruction. The computer executable instruction is configured to execute the information processing method in the embodiments of the present invention.

The embodiments of the present invention are described as follows by using an example of a real application scenario:

The embodiments of the present invention are applied to an interaction scenario of an H5 animation. Three videos may be configured and preloaded according to an information sharing requirement. That is, the three videos are preloaded after a user screen corresponding to an information item specified in a news application is accessed by enabling an entrance to the news application; and the three loaded videos are arranged in a specified storage area in sequence. First information and second information are displayed in the user screen, the first information being of a type of statically presented information, and the second information being a first video extracted from the specified storage area in sequence. It is detected that the first video is in a loading process, where an initial status corresponding to the first video is a static presentation mode. After it is detected that loading of the first video is complete, the status corresponding to the first video is switched to a dynamic presentation mode, and the first video is played, i being a positive integer, and i being greater than or equal to 1. After it is detected that playing of the first video ends, a second video is extracted from the specified storage area in sequence, and the second video is switched to for playing. An interaction screen is generated by means of simulation after it is detected that playing of the second video ends, where the interaction screen includes a touch interaction object for enabling a third video; a first operation performed on the touch interaction object is responded to; the third video is extracted from the specified storage area in sequence; and the third video is switched to for playing.

For example, the first video may be the video information in the position identified by the second box a2 in FIG. 3, and a specified character, for example, "brother B", in a specific scenario interprets the text information in the position identified by the first box a1. The second video may be shown in FIG. 4. The second video includes at least a first video frame 201, a second video frame 202, a third video frame 203, and a fourth video frame 204. The following content is to be expressed by using the second video including the video frames: When the specified character, for example, "brother B", in the specific scenario interprets the text information in the position identified by the first box a1, a scenario is dynamically presented in which "brother B" jumps into the page to tear out "fake news" (the text information in the position identified by the first box a1) and prompts a user to share specific information content and a relationship between the information content and the "fake news" with him in an interactive way such as information exchange. Playing of the third video may be triggered by using a touch interaction object 302 that is in an interaction screen 301 generated by means of simulation and that is used for enabling the third video, as shown in FIG. 5. The third video may be shown in FIG. 6: The specified character, for example, "brother B", in the specific scenario first interacts with the user on a chat screen simulating that in WeChat, and after starting the third video by using an answer button, continues to interpret the "fake news" (the text information in the position identified by the first box a1) in the third video including at least a first video frame 301 and a second video frame 302, to clarify that he is to use a game application We Fire rather than join the army, and the like. An example of integrating these videos is shown by an information presentation result in FIG. 15.

H5 is a form of presenting dynamic interaction, and rich media information may be carried for presentation. Interactive operations may be performed with users by means of dynamic information presentation. Current H5 representation forms include a representation form of a 360-degree angle of view by using a G-sensor, a representation form of dual-mobile-phone interaction, a usual multiple-choice representation form, a phone answering form, a WeChat simulation representation form, and the like. However, these are for presentation of information only. In the embodiments of the present invention applied to the H5 scenario, an interaction form of combining information and a video (that is, two representation forms exist in one H5 scenario) and triggering continuous playing is used. Currently, no corresponding H5 can do that. In this scenario, a Flash file can also be played, realizing interactive experience of an H5 presentation technology.

Figure 15:
FIG. 15 and FIG. 16 are schematic scenario diagrams of multiple actual applications in an implementation scenario of an H5 page.
Figure 16:

The interactive operations that are performed in the embodiments of the present invention applied to the H5 scenario include two sets of solutions on a mobile phone terminal and a PC terminal. Considering that the PC terminal is less convenient than the mobile phone terminal to use and an interaction effect of the PC terminal is poorer than that of the mobile phone terminal, use of the mobile phone terminal is specifically described. If the PC terminal is used for implementation, a similar implementation principle may be used, and details are not described again. For the mobile phone terminal, if the PC terminal is combined, the PC terminal may be used as an entrance. For example, the mobile phone terminal scans quick response code on the PC terminal, so as to access a page on the mobile phone terminal (as shown in FIG. 12). The interactive operations that are performed in the embodiments of the present invention applied to the H5 scenario are performed on the mobile phone terminal side. H5 of a news item—"Brother B is to join the army" is divided into five parts, for example, as shown in FIG. 15, five user screens on which information is presented in a diversified manner and a seamless video switch is implemented. An interactive session is further added. Specifically: (1) First, a just-as-good fake news page is accessed by using a news item in news headlines. This is actually an H5 page, including text, an MP4 video, and a picture. To make the "just-as-good fake news page" lifelike, text is used, including a main body, comments, and related news. The "picture" in the middle seems to be a picture (as shown in FIG. 16), and is actually a video that is being loaded. During browsing, an idol in the picture moves, speaks to a user, and then steps out of the screen. (2) The idol jumps out of the news page, tears out the image (as shown in FIG. 4). The screen in FIG. 4 displays the essence of the whole H5, surprising the user. The technology is actually implemented as a video played in full screen mode. The character "brother B" runs in (runs into the screen), and speaks and interacts with the user. (3) Next, a session such as a video chat is entered, and seamlessly following the previous video, in which the character "brother B" invites the user for a video chat. Specifically, the screen displays (the H5 page), and the page simulates a video chat screen of WeChat, and even the background music in WeChat. The "answer" button is a start key for video playing (as shown in FIG. 5). (4) Final is a video of confessions from the character "brother B", and is also a full screen video. Clarification about "joining the army" is provided, and the answer reveals, that is, he is going to join the game "We Fire as a star captain (logo)." The process is the information presentation shown in FIG. 6.

A simple description about the PC terminal is provided as follows. For specific implementation details, refer to the implementation principles of the mobile phone terminal.

The whole implementation process in the H5 scenario is simultaneously output to the PC terminal, for the user to complete by means of operation on the PC terminal, thereby ensuring multi-terminal experience, ensuring consistent experience on the mobile phone terminal and the PC terminal, to complete a closed loop. It can be seen that, during interaction, as shown in FIG. 12, only the first two steps shown in the figure are performed on the PC terminal, and the other steps are performed on the mobile phone, to complete a closed-loop technology.

In the several embodiments provided in this application, it should be understood that the disclosed device and method may be implemented in other manners. The described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections between the components may be implemented by using some interfaces. The indirect couplings or communication connections between the devices or units may be implemented in electronic, mechanical, or other forms.

The units described as separate parts may or may not be physically separate, and the parts displayed as units may or may not be physical units, that is, may be located in one position, or may be distributed on a plurality of network units. Some or all of the units may be selected to achieve the objectives of the solutions of the embodiments according to actual needs.

In addition, the functional units in the embodiments of the present invention may be integrated into one processing unit, or each of the units may exist alone physically, or two or more units may be integrated into one unit. The integrated units may be implemented in a form of hardware, or may be implemented in a form of a software functional unit.

Persons of ordinary skill in the art may understand that some or all of the steps in the method embodiments may be implemented by a program instructing relevant hardware. The program may be stored in a computer readable storage medium. When the program is executed, the steps in the method embodiments are performed. The storage medium may be any medium that is capable of storing program code, such as a portable storage device, a read-only memory (ROM, Read-Only Memory), a random access memory (RAM, Random Access Memory), a magnetic disk, or an optical disk.

Alternatively, when the integrated units in the present disclosure are implemented in the form of the software functional module and sold or used as a separate product, the integrated unit may be stored in a computer readable storage medium. Based on such an understanding, the technical solutions of the embodiments of the present invention essentially, or the part contributing to the prior art may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The storage medium may be any medium that is capable of storing program code, such as a portable storage device, a ROM, a RAM, a magnetic disk, or an optical disk.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

INDUSTRIAL APPLICABILITY

According to the embodiments of the present invention, first information and second information are displayed in the user screen, the first information being of a type of statically presented information, and the second information being an $i^{th}$ piece of multimedia information extracted from the specified storage area in sequence; it is detected that the $i^{th}$ piece of multimedia information is in a loading process, an initial status corresponding to the $i^{th}$ piece of multimedia information being a static presentation mode; and after it is detected that loading of the $i^{th}$ piece of multimedia information is complete, the status corresponding to the $i^{th}$ piece of multimedia information is switched to a dynamic presentation mode, and the $i^{th}$ piece of multimedia information is played. In this way, multiple different information types including a static information type and a dynamic information type can be simultaneously presented in the user screen, so as to present information in a diversified manner. After it is detected that playing of the $i^{th}$ piece of multimedia information ends, an $(i+1)^{th}$ piece of multimedia information is extracted from the specified storage area in sequence, and the $(i+1)^{th}$ piece of multimedia information is switched to for playing. The switch is an automatic seamless switch, and this switch process exactly requires no manual intervention from a user. Therefore, playing is smoother, there is no playing interval between multiple videos, and the user can always obtain an information presentation result and focus more on information sharing during information presentation. An interaction screen is generated by means of simulation after it is detected that playing of the $(i+1)^{th}$ piece of multimedia information ends, the interaction screen including a touch interaction object for enabling an $(i+2)^{th}$ piece of multimedia information; a first operation performed on the touch interaction object is responded to; the $(i+2)^{th}$ piece of multimedia information is extracted from the specified storage area in sequence; and the $(i+2)^{th}$ piece of multimedia information is switched to for playing. That is, an interactive session is added. Therefore, interactivity is provided during information presentation, thereby providing good interactivity between a user and presented information, and better facilitating information sharing and promotion.

What is claimed is:
1. An information processing method, comprising:
preloading M pieces of multimedia information after a user screen corresponding to an information item specified in a first application is accessed by enabling an entrance to the first application, M being a positive integer, and M being greater than or equal to 2; and arranging the M pieces of loaded multimedia information in a specified storage area in sequence;
displaying first information and second information in the user screen, the first information being of a type of statically presented information, and the second infor- mation being an $i^{th}$ piece of multimedia information extracted from the specified storage area in sequence;

detecting that the $i^{th}$ piece of multimedia information is in a loading process, an initial status corresponding to the $i^{th}$ piece of multimedia information being a static presentation mode;

after it is detected that loading of the $i^{th}$ piece of multimedia information is complete, switching the status corresponding to the $i^{th}$ piece of multimedia information to a dynamic presentation mode, and playing the $i^{th}$ piece of multimedia information, i being a positive integer, and i being greater than or equal to 1;

extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information; and generating an interaction screen by means of simulation after it is detected that playing of the $(i+1)^{th}$ piece of multimedia information ends, the interaction screen comprising a touch interaction object for enabling an $(i+2)^{th}$ piece of multimedia information; responding to a first operation performed on the touch interaction object; extracting the $(i+2)^{th}$ piece of multimedia information from the specified storage area in sequence; and switching to play the $(i+2)^{th}$ piece of multimedia information.

2. The method according to claim 1, wherein the accessing, by enabling an entrance to a first application, a user screen corresponding to an information item specified in the first application comprises:

receiving the first operation, to enable the first application and access a user screen of the first application;

displaying multiple information items in the user screen of the first application; and finding the specified information item in the multiple information items according to an information keyword, and accessing the user screen corresponding to the specified information item.

3. The method according to claim 1, wherein the accessing, by enabling an entrance to a first application, a user screen corresponding to an information item specified in the first application comprises:

receiving an information address link sent by a peer user to a local user, the information address link being link address information of the information item specified in the first application; and initiating a touch operation to be performed on the information address link, jumping to the specified information item according to the information address link, and accessing the user screen corresponding to the specified information item.

4. The method according to claim 1, wherein the accessing, by enabling an entrance to a first application, a user screen corresponding to an information item specified in the first application comprises:

scanning identification code information sent by a peer user to a local user;

parsing the identification code information to obtain an information address link after scanning is complete, the information address link being link address information of the information item specified by the first application; and initiating a touch operation to be performed on the information address link, jumping to the specified information item according to the information address link, and accessing the user screen corresponding to the specified information item.

5. The method according to claim 1, wherein the extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information comprises:

obtaining system configuration information of a terminal, and detecting, according to the system configuration information, whether the terminal uses a first operating system; and if the terminal uses the first operating system, switching from the $i^{th}$ piece of multimedia information to the $(i+1)^{th}$ piece of multimedia information for playing, according to a first policy; otherwise, switching from the $i^{th}$ piece of multimedia information to the $(i+1)^{th}$ piece of multimedia information for playing, according to a second policy.

6. The method according to claim 5, wherein the switching from the $i^{th}$ piece of multimedia information to the $(i+1)^{th}$ piece of multimedia information for playing, according to a first policy comprises:

monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, and switching to play the $(i+1)^{th}$ piece of multimedia information.

7. The method according to claim 5, wherein the switching from the $i^{th}$ piece of multimedia information to the $(i+1)^{th}$ piece of multimedia information for playing, according to a second policy comprises:

extracting the $(i+1)^{th}$ piece of multimedia information from the specified storage area in sequence, detecting whether there is a playing record for the $(i+1)^{th}$ piece of multimedia information, and pausing the $(i+1)^{th}$ piece of multimedia information if there is a playing record; and monitoring a playing progress of the $i^{th}$ piece of multimedia information; and after it is detected that playing of the $i^{th}$ piece of multimedia information ends, extracting the $(i+1)^{th}$ piece of multimedia information from the specified storage area in sequence, clearing the playing record to rewind to a start playing position of the $(i+1)^{th}$ piece of multimedia information, and switching to play the $(i+1)^{th}$ piece of multimedia information.

8. A terminal, comprising:

a memory storing a plurality of program units; and a processor in communication with the memory and configured to execute the plurality of program units, the plurality of program units comprising:

a preloading unit, configured to: preload M pieces of multimedia information after a user screen corresponding to an information item specified in a first application is accessed by enabling an entrance to the first application, M being a positive integer, and M being greater than or equal to 2; and arrange the M pieces of loaded multimedia information in a specified storage area in sequence;

a display unit, configured to display first information and second information in the user screen, the first information being of a type of statically presented information, and the second information being an $i^{th}$ piece of multimedia information extracted from the specified storage area in sequence;

a first detection unit, configured to detect that the $i^{th}$ piece of multimedia information is in a loading process, an initial status corresponding to the $i^{th}$ piece of multimedia information being a static presentation mode;

a second detection unit, configured to: after it is detected that loading of the $i^{th}$ piece of multimedia information is complete, switch the status corresponding to the $i^{th}$ piece of multimedia information to a dynamic presentation mode, and play the $i^{th}$ piece of multimedia information, i being a positive integer, and i being greater than or equal to 1;

a playing switching unit, configured to: after it is detected that playing of the $i^{th}$ piece of multimedia information ends, extract an $(i+1)^{th}$ piece of multimedia information from the specified storage area in sequence, and switch to play the $(i+1)^{th}$ piece of multimedia information; and an interaction unit, configured to: generate an interaction screen by means of simulation after it is detected that playing of the $(i+1)^{th}$ piece of multimedia information ends, the interaction screen comprising a touch interaction object for enabling an $(i+2)^{th}$ piece of multimedia information; respond to a first operation performed on the touch interaction object; extract the $(i+2)^{th}$ piece of multimedia information from the specified storage area in sequence; and switch to play the $(i+2)^{th}$ piece of multimedia information.

9. The terminal according to claim 8, wherein the terminal further comprises a first processing unit, configured to:

receive the first operation, to enable the first application and access a user screen of the first application;

display multiple information items in the user screen of the first application; and find the specified information item in the multiple information items according to an information keyword, and access the user screen corresponding to the specified information item.

10. The terminal according to claim 8, wherein the terminal further comprises a first processing unit, configured to:

receive an information address link sent by a peer user to a local user, the information address link being link address information of the information item specified in the first application; and initiate a touch operation to be performed on the information address link, jump to the specified information item according to the information address link, and access the user screen corresponding to the specified information item.

11. The terminal according to claim 8, wherein the terminal further comprises a first processing unit, configured to:

scan identification code information sent by a peer user to a local user;

parse the identification code information to obtain an information address link after scanning is complete, the information address link being link address information of the information item specified by the first application; and initiate a touch operation to be performed on the information address link, jump to the specified information item according to the information address link, and access the user screen corresponding to the specified information item.

12. The terminal according to claim 8, wherein the playing switching unit is further configured to:

obtain system configuration information of a terminal, and detect, according to the system configuration information, whether the terminal uses a first operating system; and if the terminal uses the first operating system, switch from the $i^{th}$ piece of multimedia information to the $(i+1)^{th}$ piece of multimedia information for playing, according to a first policy; otherwise, switch from the $i^{th}$ piece of multimedia information to the $(i+1)^{th}$ piece of multimedia information for playing, according to a second policy.

13. The terminal according to claim 12, wherein the playing switching unit is further configured to:

monitor a playing progress of the $i^{th}$ piece of multimedia information; and after it is detected that playing of the $i^{th}$ piece of multimedia information ends, extract the $(i+1)^{th}$ piece of multimedia information from the specified storage area in sequence, and switch to play the $(i+1)^{th}$ piece of multimedia information.

14. The terminal according to claim 12, wherein the playing switching unit is further configured to:

extract the $(i+1)^{th}$ piece of multimedia information from the specified storage area in sequence, detect whether there is a playing record for the $(i+1)^{th}$ piece of multimedia information, and pause the $(i+1)^{th}$ piece of multimedia information if there is a playing record; and monitor a playing progress of the $i^{th}$ piece of multimedia information; and after it is detected that playing of the $i^{th}$ piece of multimedia information ends, extract the $(i+1)^{th}$ piece of multimedia information from the specified storage area in sequence, clear the playing record to rewind to a start playing position of the $(i+1)^{th}$ piece of multimedia information, and switch to play the $(i+1)^{th}$ piece of multimedia information.

15. A non-transitory computer storage medium, storing a computer executable instruction for, when being executed by a processor, performing an information processing method, the method comprising:

preloading M pieces of multimedia information after a user screen corresponding to an information item specified in a first application is accessed by enabling an entrance to the first application, M being a positive integer, and M being greater than or equal to 2; and arranging the M pieces of loaded multimedia information in a specified storage area in sequence;

displaying first information and second information in the user screen, the first information being of a type of statically presented information, and the second information being an $i^{th}$ piece of multimedia information extracted from the specified storage area in sequence;

detecting that the $i^{th}$ piece of multimedia information is in a loading process, an initial status corresponding to the $i^{th}$ piece of multimedia information being a static presentation mode;

after it is detected that loading of the $i^{th}$ piece of multimedia information is complete, switching the status corresponding to the $i^{th}$ piece of multimedia information to a dynamic presentation mode, and playing the $i^{th}$ piece of multimedia information, i being a positive integer, and i being greater than or equal to 1;

extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information; and generating an interaction screen by means of simulation after it is detected that playing of the $(i+1)^{th}$ piece of multimedia information ends, the interaction screen comprising a touch interaction object for enabling an $(i+2)^{th}$ piece of multimedia information; responding to a first operation performed on the touch interaction object; extracting the $(i+2)^{th}$ piece of multimedia information from the specified storage area in sequence; and switching to play the $(i+2)^{th}$ piece of multimedia information.

16. The non-transitory computer storage medium according to claim 15, wherein the accessing, by enabling an entrance to a first application, a user screen corresponding to an information item specified in the first application comprises:
receiving the first operation, to enable the first application and access a user screen of the first application;
displaying multiple information items in the user screen of the first application; and
finding the specified information item in the multiple information items according to an information keyword, and accessing the user screen corresponding to the specified information item.

17. The non-transitory computer storage medium according to claim 15, wherein the accessing, by enabling an entrance to a first application, a user screen corresponding to an information item specified in the first application comprises:
receiving an information address link sent by a peer user to a local user, the information address link being link address information of the information item specified in the first application; and
initiating a touch operation to be performed on the information address link, jumping to the specified information item according to the information address link, and accessing the user screen corresponding to the specified information item.

18. The non-transitory computer storage medium according to claim 15, wherein the accessing, by enabling an entrance to a first application, a user screen corresponding to an information item specified in the first application comprises:
scanning identification code information sent by a peer user to a local user;
parsing the identification code information to obtain an information address link after scanning is complete, the information address link being link address information of the information item specified by the first application; and
initiating a touch operation to be performed on the information address link, jumping to the specified information item according to the information address link, and accessing the user screen corresponding to the specified information item.

19. The non-transitory computer storage medium according to claim 15, wherein the extracting, after it is detected that playing of the $i^{th}$ piece of multimedia information ends, an $(i+1)^{th}$ piece of multimedia information from the specified storage area in sequence, and switching to play the $(i+1)^{th}$ piece of multimedia information comprises:
obtaining system configuration information of a terminal, and detecting, according to the system configuration information, whether the terminal uses a first operating system; and if the terminal uses the first operating system, switching from the $i^{th}$ piece of multimedia information to the $(i+1)^{th}$ piece of multimedia information for playing, according to a first policy; otherwise, switching from the $i^{th}$ piece of multimedia information to the $(i+1)^{th}$ piece of multimedia information for playing, according to a second policy.

* * * * *